Patented Sept. 6, 1938

2,129,525

UNITED STATES PATENT OFFICE 2,129,525

ACCELERATORS

Albert M. Clifford, Stow, Ohio, assignor to Wingfoot Corporation, Wilmington, Del., a corporation of Delaware No Drawing. Application September 14, 1934, Serial No. 744,011

10 Claims. (Cl. 18—53)

This invention relates to accelerators for the vulcanization of rubber. It includes the new reaction products useful for this purpose, the method of treating rubber with them and rubber vulcanized in their presence. The new accelerators are condensation products of aldehydes and two different types of amines. One of the amines used in the preparation of these new compounds is an alkylene poly amine such as ethylene diamine, diethylene triamine, or triethylene tetramine, etc. or the composite product containing a mixture of high boiling alkylene polyamines which is obtained by autoclaving a di-halogenated alkyl compound such as ethylene dichloride and ammonia for 1 to 3 hours in the presence of a catalyst such as $CuSO_4$, $ZnCl_2$ etc. The other amine is preferably a primary aromatic amine.

The condensation products of this invention are to be distinguished from the products disclosed in Murrill U. S. Patents 1,755,703 and 1,789,927, and Cadwell U. S. Patents 1,592,820 and 1,843,443. The new products are prepared by condensation of an aldehyde with both a primary amine, preferably an aromatic amine, and an alkylene polyamine. The proportion of aldehyde to amine used in the condensation may be varied through rather wide limits, from one mol. of aldehyde to one mol. each of the primary amine (preferably aromatic) and the alkylene diamine (or other alkylene base), to a reaction mixture containing 10–15 mols of aldehyde to the same amount of amines. Equimolecular quantities of the primary amine and alkylene diamine may be used, or more than one mol. of the one may be used for each mol. of the other. By thus varying the proportion of the different ingredients used in the reaction the properties of the final product may be controlled.

The primary amine used in carrying out the reaction is preferably an aromatic amine such as aniline, one or more of the toluidines, one or more of the xylidines, benzylamine, benzidine, diamino diphenyl methane, diamino ditolyl methane, diamino diphenyl amine, alpha-naphthyl amine, tetrahydro naphthyl amine, amino phenol, beta-phenylethyl amine, etc. Aliphatic amines which may be used include methyl amine, ethyl amine, butyl amine, amyl amine, cyclo hexyl amine, the propanol amines, the alkyl cyclohexyl amines such as methyl cyclohexyl amine, etc., the alkoxy cyclohexyl amines such as methoxy cyclohexyl amine, etc. and heterocyclic amines such as furfuryl amine, tetrahydro furfuryl amine, amino pyridine, etc. Two or more of these amines may be used if desired.

The aldehydes used in carrying out the reaction include as preferred compounds crotonaldehyde and butyraldehyde. Other aldehydes which may be used include formaldehyde, acetaldehyde, heptaldehyde, beta-hydroxy-alpha-naphthaldehyde, acrolein, furfural, and aldehydes of the condensation type such as alpha-ethyl-beta-propyl acrolein, etc.

The alkylene diamines include compounds such as butylene-, propylene-, amylene-, etc. diamines and other high boiling alkylene polyamines obtained in the production of these compounds which may boil as low as 125° or 150° and up to 175° to 300° C. or higher, although the preferred alkylene base is ethylene diamine.

The reaction products are complex bases. Generally they are obtained as thick oils or syrups. Those derived in part from aromatic amines possess generally a very mild amine odor while those derived from aliphatic amines, particularly low boiling aliphatic amines possess a characteristically potent amine odor. In the simpler cases the products are believed to contain bases of the types

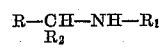

and

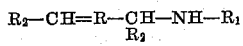

where R is an alkylene diamino group, $R_1$ is the primary amine residue and $R_2$ is the aldehyde residue. In the second formula it will be observed that two aldehyde residues are condensed with the primary amine and the alkylene diamine. Examples of these two compounds in which ethylene diamine is the alkylene diamine used are

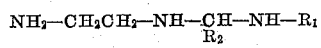

and

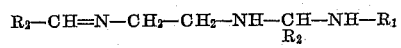

where $R_1$ is the primary amine residue and $R_2$ is the aldehyde residue. Compounds of this general type are found in reaction products obtained from reactions employing other alkylene diamines and alkylene polyamines.

In the case of the polyalkylene polyamines the products are more complicated in structure and the number of compounds obtained is greater, depending at least in part upon the number of individual amines present in the composite product of the polyamines. The composition of the product obtained will vary. It can readily be understood that these mixtures are too complex for complete separation into individual compounds. Such separation is neither necessary, nor ordinarily desirable for practical purposes. Rubber vulcanized in the presence of these accelerators has particularly good ageing properties and the vulcanized stocks show excellent resistance to tear.

Various condensation products of this type have been prepared.

It will be apparent from the foregoing that a great variety of condensation products of the general type coming within the invention can be prepared. This is possible particularly since the diamines employed are bifunctional in character, having two reactive amino groups, and hence permit the formation of chain-like structures through an aldehyde linkage, yielding an almost endless variety of novel compounds. These materials have been found to cover a wide range of curing properties with relatively fast acceleration in the case of aliphatic derivatives, while, in the case of derivatives of primary aromatic amines such as aniline, toluidines, etc., an attenuated, less scorchy acceleration is obtained. Thus, by judicious selection of the starting ingredients, compounds of the general class possessing almost any desired curing characteristics may be obtained. Furthermore, not only is the scope of the class such that an unusually wide range of curing characteristics is available but, in fact, it is possible to prepare compounds of the present type having a peculiar combination of curing properties impossible of attainment in the simpler aldehyde-amine accelerators.

They have been found to be good accelerators. The following examples are illustrative. Following the same general procedure, reaction products may be obtained from different starting materials.

*Example A.*—To a mixture of 30 parts p p' diamino diphenyl methane and 16.3 parts ethylene diamine are added slowly 22 parts of butyraldehyde. An exothermic reaction takes place, necessitating the use of a reflux condenser for retaining the aldehyde. After the main reaction has subsided the reflux may be replaced by a still head and heating continued to remove the water formed. The reaction product is heated to 140° C. to remove low boiling point constituents. The residue, 52 parts, is a thick, orange colored syrup of mild odor. It may be used directly as an accelerator.

*Example B.*—A mixture of 25 parts high boiling ethylene polyamines and 18.6 parts aniline is cooled and treated slowly with 8.8 parts of acetaldehyde. After the initial vigorous reaction has subsided the mixture is heated gradually in a still so as to volatilize the water of condensation and remove low boiling products. This distillation is terminated when the residual product in the still reaches a temperature of 130° C.; the residue, 41.8 parts constitutes a satisfactory accelerator.

*Example C.*—To a cooled mixture of 18.6 parts of aniline and 25 parts of high boiling ethylene polyamines is added gradually with cooling and shaking 14 parts crotonaldehyde. After the initial exothermic reaction has subsided the mixture is heated gradually to the point where the water evolved from the condensation volatilizes, then finally to 115° C. The residue 50.7 parts may be used as an accelerator.

A catalyst, such as acetic acid, butyric acid or other catalyst of the acid type may be employed with acetaldehyde, butyraldehyde, or other aldehyde, respectively as by adding it to the mixture of amines. The use of such a catalyst is particularly helpful in reactions in which more than one molecular equivalent of the primary amine is used for each molecular equivalent of the alkylene polyamine, and more especially in such reactions where more than one molecular equivalent of aldehyde is used for each molecular equivalent of the primary amine and alkylene polyamine. A reaction illustrative of the latter type is one involving 9 mols of aldehyde, 1 mol. of alkylene diamine and 3 mols of aniline.

The value of these new materials was tested by compounding them with rubber as follows:

|  | Parts |
|---|---|
| Extracted rubber | 100 |
| Zinc oxide | 5 |
| Sulphur | 3 |
| Stearic acid | 1.5 |
| Accelerator | .5 |

Two sets of samples were prepared for each accelerator. The different samples in each set were given a different cure. One set of samples was then tested immediately for tensile strength and elongation. The samples of the other set were weighed, aged in an oxygen bomb for six days at a temperature of 50° C. and at a pressure of 150 pounds per square inch, and reweighed in order to ascertain the increase in weight due to absorption of oxygen and then tested for elasticity and strength. In the following table the cure is shown in minutes at the temperature (Fahrenheit) employed. The starting materials from which the various accelerators were prepared are given, the figures in parentheses indicating, respectively, the molecular equivalents of each ingredient used in making the condensation product. The condensation product used in Examples 2, 5, and 6 below is that prepared as described in Examples A, B and C. The high boiling ethylene polyamines of Examples 4–7 and also B and C are a mixture of bases boiling from 176–250° and containing diethylene triamine, triethylene tetramine and other bases. (The molecular proportions in the following Examples 4–7 are figured on an assumed molecular weight of 125.)

|  | Before ageing | | | | After ageing | | | |
|---|---|---|---|---|---|---|---|---|
| Cure | Tensile | Elong. | 500% | 700% | Tensile | Elong. | 500% | 700% |

*Example 1.—Ethylene diamine—mono amyl amine—crotonaldehyde (1:1:2)*

| Cure | Tensile | Elong. | 500% | 700% | Tensile | Elong. | 500% | 700% |
|---|---|---|---|---|---|---|---|---|
| 20/260 | 103 | 810 | 15 | 53 | 14 | 530 | | |
| 40 | 135 | 800 | 20 | 72 | 20 | 380 | | |
| 60 | 196 | 825 | 24 | 96 | 20 | 210 | | |
| 80 | 179 | 765 | 31 | 122 | 18 | 150 | | |

*Example 2.—Ethylene diamine—diamino diphenyl methane—butyraldehyde (1:1:2)*

| Cure | Tensile | Elong. | 500% | 700% | Tensile | Elong. | 500% | 700% |
|---|---|---|---|---|---|---|---|---|
| 20/260 | 34 | 910 | 5 | 12 | 28 | 830 | | |
| 40 | 69 | 875 | 10 | 28 | 65 | 805 | | |
| 60 | 97 | 850 | 13 | 43 | 98 | 815 | | |
| 80 | 98 | 830 | 14 | 45 | 111 | 820 | | |

|  | Before ageing | | | | After ageing | | | |
| --- | --- | --- | --- | --- | --- | --- | --- | --- |
| Cure | Tensile | Elong. | 500% | 700% | Tensile | Elong. | 500% | 700% |
| *Example 3.—Ethylene diamine—cyclohexyl amine—crotonaldehyde (1:1:2)* | | | | | | | | |
| 20/260 | 108 | 875 | 13 | 40 | 18 | 615 | ----- | ----- |
| 40 | 145 | 825 | 19 | 72 | 14 | 225 | ----- | ----- |
| 60 | 176 | 805 | 24 | 95 | 16 | 185 | ----- | ----- |
| 80 | 187 | 800 | 26 | 106 | 16 | 150 | ----- | ----- |
| *Example 4.—Aniline—high boiling ethylene poly amine—formaldehyde (1:1:1)* | | | | | | | | |
| 50/260 | 69 | 955 | 9 | 20 | 52 | 910 | 7 | 16 |
| 60 | 68 | 905 | 10 | 23 | 51 | 890 | 7 | 18 |
| 80 | 99 | 915 | 12 | 32 | 55 | 860 | 9 | 23 |
| 100 | 113 | 890 | 14 | 40 | 54 | 830 | 10 | 30 |
| *Example 5.—Aniline—high boiling ethylene poly amine—acetaldehyde (1:1:1)* | | | | | | | | |
| 10/260 | 59 | 995 | 8 | 16 | 40 | 930 | 5 | 12 |
| 20 | 85 | 920 | 11 | 27 | 68 | 880 | 8 | 25 |
| 30 | 114 | 870 | 15 | 45 | 87 | 795 | 14 | 50 |
| 50 | 146 | 820 | 23 | 75 | 132 | 825 | 17 | 66 |
| *Example 6.—Aniline—high boiling ethylene poly amine—crotonaldehyde (1:1:1)* | | | | | | | | |
| 5/260 | 53 | 975 | 8 | 16 | 35 | 900 | 6 | 13 |
| 10 | 90 | 925 | 12 | 29 | 77 | 910 | 9 | 24 |
| 20 | 114 | 845 | 19 | 53 | 101 | 855 | 13 | 42 |
| 30 | 129 | 810 | 21 | 70 | 115 | 810 | 17 | 60 |
| *Example 7.—Aniline—high boiling ethylene poly amine—crotonaldehyde (1:1:2)* | | | | | | | | |
| 10/260 | 59 | 915 | 10 | 20 | 47 | 900 | 7 | 16 |
| 20 | 96 | 880 | 13 | 37 | 74 | 875 | 9 | 28 |
| 30 | 116 | 850 | 17 | 51 | 72 | 825 | 10 | 36 |
| 60 | 131 | 775 | 27 | 88 | 59 | 705 | 17 | 55 |

These accelerators may be used together with other accelerators and various types of fillers and compounding agents. For example, they may advantageously be used in chemical combination with stearic acid.

I claim:

1. The condensation product of crotonaldehyde, aniline and ethylene diamine.

2. The method of treating rubber which comprises incorporating therein as an accelerator a condensation product of crotonaldehyde, aniline and ethylene diamine, and vulcanizing.

3. Rubber vulcanized in the presence of the condensation product of crotonaldehyde, aniline and ethylene diamine.

4. Condensation products of crotonaldehyde, a primary amine and an alkylene polyamine.

5. Condensation products of crotonaldehyde, a primary amine and an ethylene polyamine.

6. Condensation products of crotonaldehyde, a primary aromatic amine and a high boiling ethylene polyamine.

7. A method of treating rubber which comprises incorporating therein as an accelerator a condensation product of crotonaldehyde, a primary amine and an alkylene polyamine, and then curing the mix.

8. A method of treating rubber which comprises incorporating therein as an accelerator a condensation product of crotonaldehyde, a primary amine and an ethylene polyamine, and then curing the mix.

9. A method of treating rubber which comprises incorporating therein as an accelerator a condensation product of crotonaldehyde, a primary aromatic amine and a high boiling ethylene polyamine, and then curing the mix.

10. A rubber product which has been vulcanized in the presence of a condensation product of crotonaldehyde, a primary amine and an alkylene polyamine.

ALBERT M. CLIFFORD.